US012566633B2

(12) United States Patent
Sethi et al.

(10) Patent No.: US 12,566,633 B2
(45) Date of Patent: Mar. 3, 2026

(54) METHOD AND SYSTEM FOR MANAGING RESOURCE UTILIZATION OF APPLICATIONS

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 428 days.

(21) Appl. No.: 18/304,077

(22) Filed: Apr. 20, 2023

(65) Prior Publication Data

US 2024/0354160 A1     Oct. 24, 2024

(51) Int. Cl.
*G06F 9/50* (2006.01)

(52) U.S. Cl.
CPC ............ *G06F 9/5011* (2013.01); *G06F 9/505* (2013.01)

(58) Field of Classification Search
CPC ...................................................... G06F 9/5011
See application file for complete search history.

(56) References Cited

U.S. PATENT DOCUMENTS

| | | | |
|---|---|---|---|
| 6,105,035 A | 8/2000 | Monge |
| 6,195,760 B1 | 2/2001 | Chung et al. |
| 6,393,480 B1 | 5/2002 | Qin |
| 7,251,745 B2 | 7/2007 | Koch et al. |

| | | | |
|---|---|---|---|
| 7,401,248 B2 | 7/2008 | Nakahara et al. | |
| 7,525,749 B2 | 4/2009 | Maejima et al. | |
| 7,590,981 B2 | 9/2009 | Gupta et al. | |
| 8,078,448 B1 | 12/2011 | Wohlberg et al. | |
| 8,364,799 B2 | 1/2013 | Sakai | |
| 8,370,592 B1 | 2/2013 | Specht et al. | |
| 8,918,673 B1 | 12/2014 | Rangaiah et al. | |
| 9,015,832 B1 | 4/2015 | Lachwani et al. | |
| 9,417,918 B2 | 8/2016 | Chin | |
| 9,514,164 B1 | 12/2016 | Matic | |
| 10,303,465 B1 | 5/2019 | Potter | |
| 10,572,294 B1 | 2/2020 | Chawda et al. | |
| 11,128,464 B1 | 9/2021 | Loladia | |
| 11,249,790 B1 * | 2/2022 | Gupta ................... | G06F 9/5077 |

(Continued)

FOREIGN PATENT DOCUMENTS

| | | |
|---|---|---|
| WO | 2021122516 A1 | 6/2021 |
| WO | 2022104396 A1 | 5/2022 |

OTHER PUBLICATIONS

Matsunaga, Andréa, and José AB Fortes. "On the use of machine learning to predict the time and resources consumed by applications." 2010 10th IEEE/ACM International Conference on Cluster, Cloud and Grid Computing. IEEE, 2010 (Year: 2010).*

(Continued)

*Primary Examiner* — Charlie Sun
(74) *Attorney, Agent, or Firm* — Chamberlain, Hrdlicka, White, Williams & Aughtry; Aly Z. Dossa

(57) ABSTRACT

A method for managing resource utilization includes identifying a quota limit of an environment, performing a forecast of system resource utilization for an application running on the environment, making a determination that the forecast of system resource utilization would cause the quota limit to be exceeded, and increasing the quota limit based on the determination.

10 Claims, 3 Drawing Sheets

(56) References Cited

U.S. PATENT DOCUMENTS

| 11,392,402 | B1 | 7/2022 | Carroll |
| 11,487,878 | B1 | 11/2022 | Zhang et al. |
| 11,500,678 | B2 | 11/2022 | Sumangala et al. |
| 11,595,269 | B1 | 2/2023 | Ghosh et al. |
| 11,846,918 | B1 | 12/2023 | Mazur |
| 12,039,364 | B1 | 7/2024 | Tkhai |
| 2002/0138226 | A1 | 9/2002 | Doane |
| 2003/0233230 | A1 | 12/2003 | Ammicht |
| 2005/0216800 | A1 | 9/2005 | Bicknell et al. |
| 2005/0257090 | A1 | 11/2005 | Santos |
| 2005/0273633 | A1 | 12/2005 | Wilcox |
| 2006/0129771 | A1 | 6/2006 | Dasgupta et al. |
| 2007/0079170 | A1 | 4/2007 | Zimmer et al. |
| 2007/0198524 | A1 | 8/2007 | Branda et al. |
| 2007/0198968 | A1 | 8/2007 | Shenfield |
| 2007/0239500 | A1 | 10/2007 | Barrett et al. |
| 2008/0046960 | A1* | 2/2008 | Bade ..................... G06F 9/5027 |
| | | | 726/1 |
| 2008/0222218 | A1 | 9/2008 | Richards et al. |
| 2009/0157882 | A1 | 6/2009 | Kashyap |
| 2009/0307522 | A1 | 12/2009 | Olson et al. |
| 2011/0087672 | A1 | 4/2011 | Hui |
| 2011/0113224 | A1 | 5/2011 | Isshiki et al. |
| 2011/0151023 | A1 | 6/2011 | Wernet |
| 2011/0154104 | A1 | 6/2011 | Swanson et al. |
| 2011/0251998 | A1 | 10/2011 | Moore |
| 2011/0307903 | A1 | 12/2011 | Vaddagiri |
| 2012/0072571 | A1 | 3/2012 | Orzell et al. |
| 2012/0089711 | A1 | 4/2012 | Zager |
| 2012/0151061 | A1 | 6/2012 | Bartfai-walcott |
| 2012/0254849 | A1 | 10/2012 | Wang |
| 2013/0103977 | A1 | 4/2013 | Zimmermann |
| 2013/0346714 | A1 | 12/2013 | Solihin |
| 2014/0075029 | A1* | 3/2014 | Lipchuk ................ G06F 9/5077 |
| | | | 709/226 |
| 2014/0172782 | A1 | 6/2014 | Schuenzel |
| 2014/0376385 | A1 | 12/2014 | Boss et al. |
| 2015/0169329 | A1 | 6/2015 | Barrat |
| 2015/0222702 | A1 | 8/2015 | Salle |
| 2015/0261518 | A1 | 9/2015 | Viswanathan |
| 2015/0278219 | A1 | 10/2015 | Phipps |
| 2015/0326542 | A1 | 11/2015 | Serebrin |
| 2015/0347573 | A1 | 12/2015 | Hosokawa |
| 2016/0162280 | A1 | 6/2016 | Murayama et al. |
| 2016/0239395 | A1 | 8/2016 | Madsen et al. |
| 2016/0266875 | A1 | 9/2016 | Takahashi |
| 2016/0378168 | A1 | 12/2016 | Branover |
| 2016/0378525 | A1 | 12/2016 | Bjorkengren |
| 2017/0272419 | A1 | 9/2017 | Kumar |
| 2017/0337088 | A1 | 11/2017 | Wang |
| 2018/0039519 | A1 | 2/2018 | Kumar et al. |
| 2018/0113728 | A1 | 4/2018 | Musani et al. |
| 2018/0124182 | A1 | 5/2018 | Orman |
| 2018/0157723 | A1 | 6/2018 | Chougule |
| 2018/0196655 | A1 | 7/2018 | Kapoor et al. |
| 2018/0262979 | A1 | 9/2018 | Wang et al. |
| 2018/0287898 | A1* | 10/2018 | Bellini, III ......... H04L 41/5009 |
| 2018/0322276 | A1 | 11/2018 | Brown |
| 2019/0104019 | A1 | 4/2019 | Makovsky |
| 2019/0171472 | A1 | 6/2019 | Wyble |
| 2019/0199687 | A1 | 6/2019 | Lan |
| 2019/0310872 | A1 | 10/2019 | Griffin |
| 2019/0311041 | A1 | 10/2019 | Shah |
| 2020/0026538 | A1 | 1/2020 | Cui et al. |
| 2020/0110655 | A1 | 4/2020 | Harwood et al. |
| 2020/0133772 | A1 | 4/2020 | Dalmatov et al. |
| 2020/0156243 | A1 | 5/2020 | Ghare et al. |
| 2020/0174830 | A1 | 6/2020 | Hermenier |
| 2020/0233713 | A1* | 7/2020 | Zhao ..................... G06F 9/5083 |
| 2020/0264930 | A1 | 8/2020 | Mandagere et al. |
| 2020/0310853 | A1 | 10/2020 | Featonby |
| 2020/0310885 | A1 | 10/2020 | Rajamani et al. |
| 2020/0349238 | A1 | 11/2020 | Tyagi |
| 2020/0366604 | A1 | 11/2020 | Banerjee et al. |
| 2021/0026707 | A1 | 1/2021 | Rosenberg |
| 2021/0165768 | A1 | 6/2021 | D'halluin et al. |
| 2021/0200814 | A1 | 7/2021 | Tal |
| 2021/0294704 | A1 | 9/2021 | Rosenberg |
| 2021/0373947 | A1 | 12/2021 | Kweon |
| 2022/0070648 | A1 | 3/2022 | Krishan |
| 2022/0075613 | A1 | 3/2022 | Ramachandran |
| 2022/0138081 | A1 | 5/2022 | Varma et al. |
| 2022/0158926 | A1 | 5/2022 | Wennerström et al. |
| 2022/0164186 | A1 | 5/2022 | Pamidala |
| 2022/0171856 | A1 | 6/2022 | Bhatt |
| 2022/0179683 | A1 | 6/2022 | Verma et al. |
| 2022/0337493 | A1 | 10/2022 | Sant et al. |
| 2022/0365824 | A1 | 11/2022 | Coutinho Moraes et al. |
| 2022/0413878 | A1 | 12/2022 | Tibrewal et al. |
| 2023/0037124 | A1 | 2/2023 | Mengwasser et al. |
| 2023/0080047 | A1 | 3/2023 | Bashir |
| 2023/0098941 | A1 | 3/2023 | Rizzi et al. |
| 2023/0251701 | A1 | 8/2023 | Chamberlin et al. |
| 2023/0315537 | A1* | 10/2023 | Samareh Abolhasani .................. |
| | | | G06F 11/3438 |
| | | | 718/104 |
| 2023/0350708 | A1 | 11/2023 | Draznin et al. |
| 2023/0393904 | A1 | 12/2023 | Jonnalagadda |
| 2024/0152401 | A1* | 5/2024 | Naseem .................. G06F 9/505 |
| 2024/0184652 | A1 | 6/2024 | Kunz |
| 2024/0248768 | A1 | 7/2024 | Sethi |
| 2024/0251021 | A1 | 7/2024 | Sethi |
| 2025/0071040 | A1 | 2/2025 | Wang et al. |

OTHER PUBLICATIONS

Wu, Suzhen et al., "Proactive Data Migration for Improved Storage Availability in Large-Scale Data Centers", IEEE Transactions on Computers, vol. 64, No. 9, Sep. 2015, pp. 2637-2651 (Year: 2015).

* cited by examiner

300

METHOD AND SYSTEM FOR MANAGING RESOURCE UTILIZATION OF APPLICATIONS

BACKGROUND

Computing devices may provide services. To provide the services, the computing devices may include hardware components and software components. The software components may store information usable to provide the services using the hardware components. Certain environments may have one or more limits that may be increased or applications may be migrated from one environment to another environment.

SUMMARY

In general, embodiments described herein relate to a method for managing resource utilization. The method includes identifying a quota limit of an environment, performing a forecast of system resource utilization for an application running on the environment, making a determination that the forecast of system resource utilization would cause the quota limit to be exceeded, and increasing the quota limit based on the determination.

In general, embodiments described herein relate to a method for managing resource utilization. The method includes identifying a first quota limit of a first environment and a second quota limit of a second environment, performing a forecast of system resource utilization for an application running on the first environment, making a first determination that the forecast of environment resource utilization exceeds the first quota limit, making a second determination that the forecast of system resource utilization would not cause the second quota limit to be exceeded, and migrating the application from the first environment to the second environment based on the first and second determinations.

In general, embodiments described herein relate to a method for managing resource utilization. The method includes identifying a current resource allocation limit of a first environment, forecasting a future resource allocation limit of the first environment based on historical resource allocation limits, making a determination that the future resource allocation limit is greater than the current resource limit, and performing a resource mitigation action based on the determination.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

DETAILED DESCRIPTION

Figure 1:
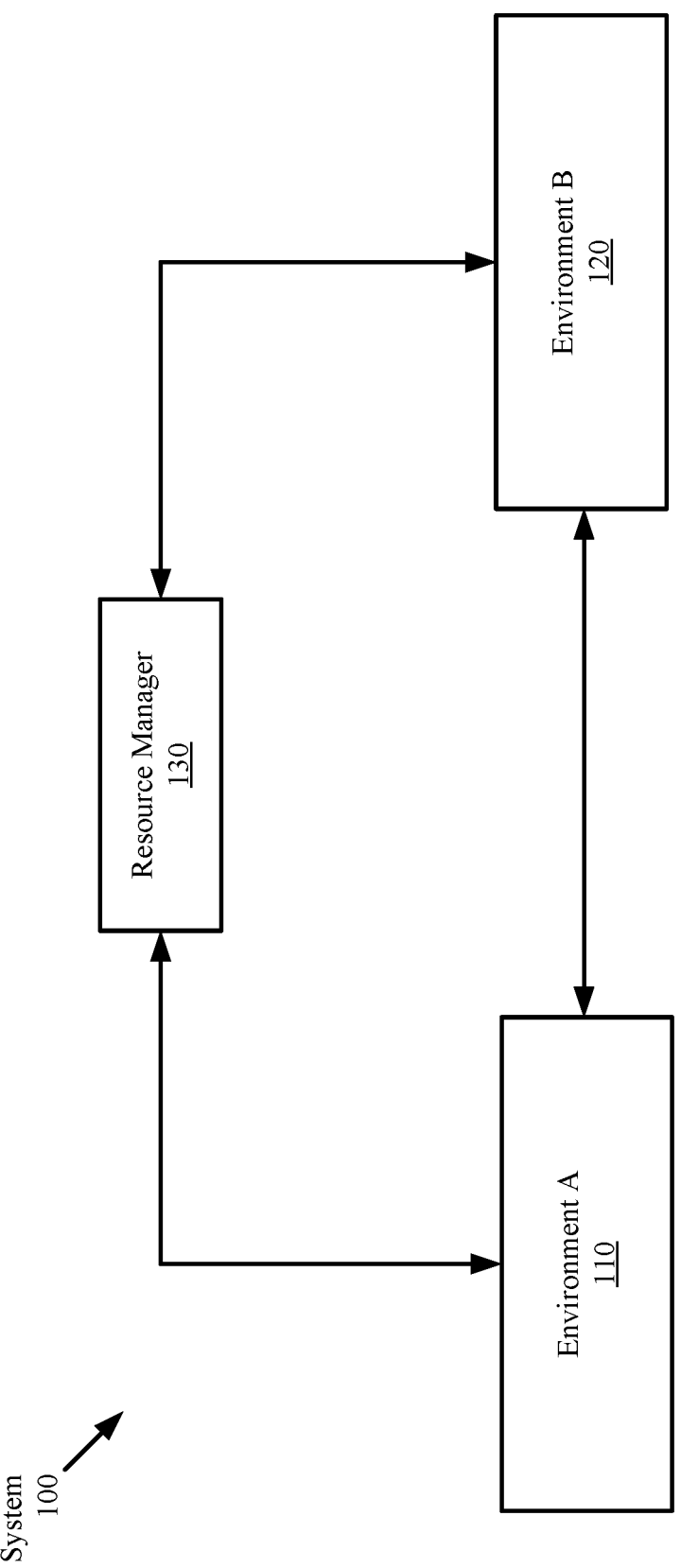
FIG. 1 shows a diagram of a system in accordance with one or more embodiments.

In the below description, numerous details are set forth as examples of embodiments described herein. It will be understood by those skilled in the art, and having the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems and non-transitory computer readable mediums storing instructions for managing resource utilization in computing environments. In certain computing environments, resource utilization limits, or quota limits, exist and limit the resources available in a computing environment. Providing a method to predict when these limits may be exceeded may prevent any interruptions in access to the applications on the environments. Further, providing a method to predict when the limits may be exceeded and preforming a resource mitigation action adds predictability to the operation of the applications.

The following describes various embodiments of the invention.

FIG. 1 shows a diagram of a system (100) in accordance with one or more embodiments. The system (100) includes one or more environments (e.g., environment A (110), environment B (120), etc.) and a resource manager (130). The system (100) may include additional, fewer, and/or different components without departing from the scope of the embodiments disclosed herein. Each component may be operably connected to any of the other components via any combination of wired and/or wireless connections. Each component illustrated in FIG. 1 is discussed below.

In one or more embodiments, the environments (110, 120) and the resource manager (130) may be physical or logical devices, as discussed below. Environment A (110) may be operably connected to environment B (120) via a network (not shown), in which the network may allow environment A (110) (e.g., components of environment A (110)) to communicate with environment B (120) (e.g., components of environment B (120)). Further, environment A (110) and environment B (120) may be directly connected, without an intervening network. In addition, environment A (110) and environment B (120) may include any further number of environments.

Further, the functioning of environment A (110) and environment B (120) is not dependent upon the functioning and/or existence of the other components (e.g., devices) in the system (100). Rather, environment A (110) and environment B (120) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system also includes the resource manager (130). In one or more embodiments, the resource manager (130) is operatively connected to each of the environments (e.g., 110, 120). The resource manager (130) may be located within any one of the environments, at each environment, at a portion of the environment, or separate from and connected to each environment.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a computing device includes and/or is operatively connected to any number of storage volumes (not shown). In one or more embodiments, a volume is a logically accessible storage element of a computing system. A volume may be part of one or more disk drives, and may or may not include any number of partitions. In one or more embodiments, a volume stores information relevant to the operation and/or accessible data of a computing device. In one or more embodiments, a volume may be all or part of any type of computing device storage (described above).

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the environments (110, 120) may deliver computing power, storage capacity, and data protection (e.g., software-defined data protection) as a service to users of the client device(s) (Not shown). The environments (110, 120) may also represent a comprehensive middleware layer executing on computing devices (e.g., 300, FIG. 3) that supports virtualized application environments. In one or more embodiments, the environments (110, 120) may support one or more virtual machine (VM) environments, and may map capacity requirements (e.g., computational load, storage access, etc.) of VMs and supported applications to available resources (e.g., processing resources, storage resources, etc.) managed by the environments (110, 120). Further, the environments (110, 120) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being a physical computing device or a logical computing device (e.g., a VM), the environments (110, 120) may be configured for hosting and maintaining various workloads, and/or for providing a computing environment (e.g., computing power and storage) whereon workloads may be implemented. In general, an environment's (e.g., a site's, a node's, etc.) infrastructure is based on a network of computing and storage resources that enable the delivery of shared applications and data. For example, an environment (e.g., 110) of an organization may exchange data with other environments (e.g., 120) of the same organization registered in/to a network in order to, for example, participate in a collaborative workload placement. As yet another example, an environment (e.g., 110) may split up a request (e.g., an operation, a task, an activity, etc.) with another environment (e.g., 120), coordinating its efforts to complete the request (e.g., to generate a response) more efficiently than if the environment (e.g., 110) had been responsible for completing the request. One of ordinary skill will appreciate that an environment (e.g., 110, 120, etc.) may perform other functionalities without departing from the scope of the invention.

In one or more embodiments, an environment (e.g., 110, 120, etc.) may be a part of a business operation region (BOR) (not shown) of an organization, in which the BOR corresponds to a geographic region (e.g., a city, a county, a state, a province, a country, a country grouping (e.g., the European Union), etc.). For example, environment A (110) of Organization X may be located in the United States and environment B (120) of Organization X may be located in the Netherlands, in which Organization X has multiple geographically distributed environments around the world.

Figure 3:
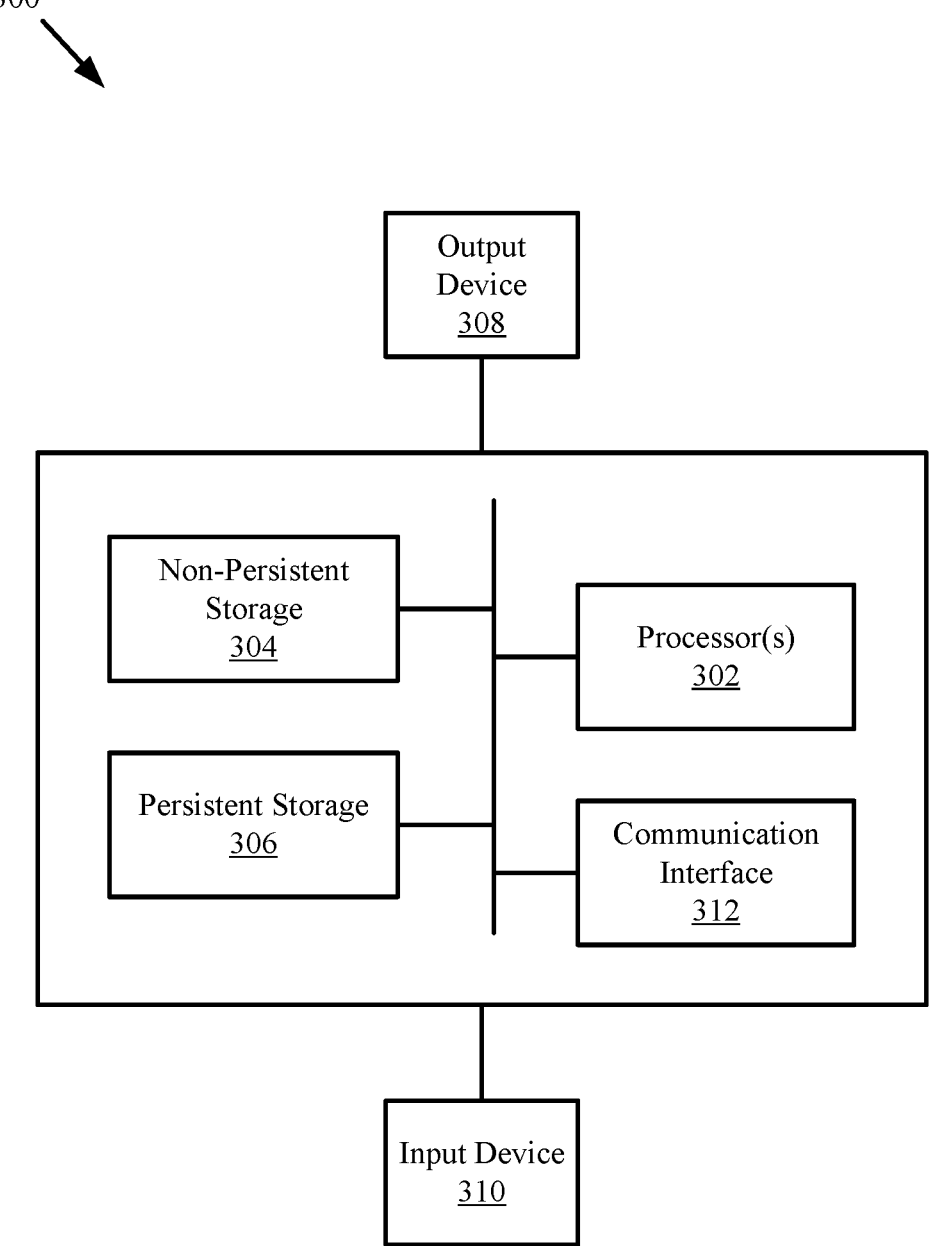
FIG. 3 shows a diagram of a computing device in accordance with one or more embodiments.

In one or more embodiments, the environment (e.g., 110, 120, etc.) and/or the resource manager (130) may be implemented as a computing device (e.g., 300, FIG. 3). Alternatively, in one or more embodiments, the environment (e.g., 110, 120, etc.) and/or the resource manager (130) may be implemented as a logical device. The logical device may utilize the computing resources of any number of computing devices to provide the functionality of the environment (e.g., 110, 120, etc.) and/or the resource manager (130) described throughout this application.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, an FC-based storage device, a floppy disk, a diskette, a compact disc (CD), a digital versatile disc (DVD), a NVMe device, a NVMe over Fabrics (NVMe-oF) device, resistive RAM (ReRAM), persistent memory (PMEM), virtualized storage, virtualized memory, etc.

As used herein, "storage" refers to a hardware component that is used to store data in a client. Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a client. The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of a client).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc. A networking resource may communicate via any suitable form of wired interface (e.g., Ethernet, fiber optic, serial communication etc.) and/or wireless interface, and may utilize one or more protocols (e.g., TCP, UDP, RDMA, IEEE 801.11, etc.) for the transmission and receipt of data.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of a data center. The VM (and applications hosted by the VM) may generate data (e.g., VM data) that is stored in the storage/memory resources of the data center, in which the VM data may reflect a state of the VM. In one or more embodiments, the VM may provide services to users, and may host instances of databases, email servers, or other applications that are accessible to the users.

In one or more embodiments, a virtualization resource may include a hypervisor, in which the hypervisor may be configured to orchestrate an operation of a VM by allocating computing resources of an environment to the VM. In one or more embodiments, the hypervisor may be a physical device including circuitry. The physical device may be, for example (but not limited to) a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the data center that when executed by processing resources of the client cause the data center to provide the functionality of the hypervisor.

While FIG. 1 shows a configuration of components, other configurations may be used without departing from the scope of embodiments described herein. Accordingly, embodiments disclosed herein should not be limited to the configuration of components shown in FIG. 1.

Figure 2:
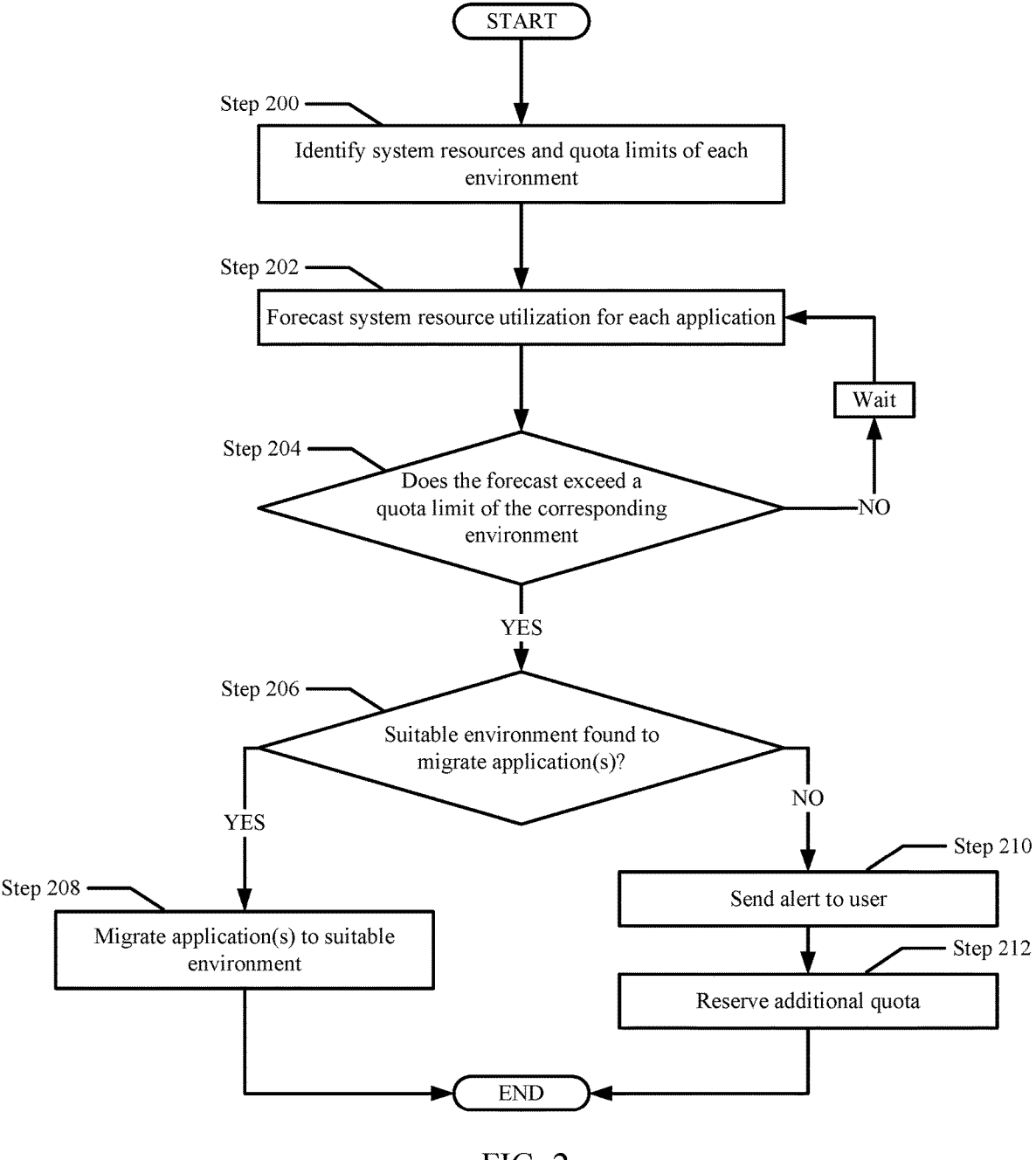
FIG. 2 shows a method for managing resource utilization in accordance with one or more embodiments.

FIG. 2 shows a method for managing resource utilization in one or more environments in accordance with one or more embodiments. While various steps in the method are presented and described sequentially, those skilled in the art will appreciate that some or all of the steps may be executed in different orders, may be combined or omitted, and some or all steps may be executed in parallel without departing from the scope of the invention.

The method shown in FIG. 2 may help to manage resource utilization in environments and specifically may help a user to manage quota limits within environments and to efficiently utilize the available quota limits of each environment. In doing so, an organization may maximize the use of available resources without causing any interruptions in the services provided by the environments. Further, managing a large number of applications, each with different dependencies, can be difficult to understand the system resource utilization of the applications and what affect migrating some applications to different environments might have on the applications that are not migrated.

Turning now to FIG. 2, the method shown in FIG. 2 may be executed by, for example, the above-discussed resource manager (e.g., 130, FIG. 1). Other components of the system illustrated in FIG. 1 may also execute all or part of the method shown in FIG. 2 without departing from the scope.

In Step 200, the resource manager identifies system resources and quota limits of each environment (e.g., 110, 120, FIG. 1). Identifying the system resources environment may include identifying (i) any portion, including all of, the hardware resources, networking resources, processing resources, memory or storage resources, and/or virtualization resources located in the environment and any details relating to the specifications of the resources, including the type of the resource, quantity of the resource, power consumption of the resource, capabilities of the resource, etc., (ii) any portion, including all of, the connections between resources, (iv) the physical location of the resources, and (v) the location and type of the power generating systems.

In one or more embodiments, each environment includes one or more quota limits. A quota limit is a limit set in the environment that limits the availability of one or more resources to a maximum value. The quota limit may be based on any combination of the hardware resources, networking resources, processing resources, memory or storage resources, virtualization resources located in the corresponding environment, available licenses, and/or reliability of the environment. For example, if a quota limit in an environment is 8 gigabytes of volatile memory, then the total usage of applications running in that environment are limited to 8 gigabytes of volatile memory. Further, as discussed below, the quota limits may be reserved and may be increased.

In Step 202, the resource manager forecasts system resource utilization for each application. The resource manager obtains and stores data of historical system resource utilization for each application. For example, one application serves 100 requests per second and consumes a first amount of processing, memory, and power during regular business hours for a certain time zone and then decreases to 10 requests per second and consumes a second amount of processing, memory, and power outside of regular business hours for the certain time zone. In one or more embodiments, the forecast may be performed partially manually by a user entering a certain amount of system resources to be reserved and the load balancer agent may forecast the associated power needs for the amount of reserved system resources.

In one or more embodiments, the forecast also includes determining the dependencies of each application. A first application being dependent on a second application means that the first application may require the second application to also be running in the same environment to operate properly. Thus, when forecasting the resource utilization for the first application, the resource manager must also take into account the resource utilization of the second application too. Further, with respect to the above example, the first application is considered a dependent application and the second application is considered an independent application.

In Step 204, the resource manager determines whether the forecasted system resource utilization exceeds a quota limit of a corresponding environment. If the resource manager determines that the answer is NO, and the forecasted system resource utilization does not exceed a quota limit of a corresponding environment, then the resource manager waits and the method returns to Step 202. In this manner, the resource manager continues to monitor the system resource utilization and allows the environment to continue to operate as-is until the answer changes. The amount of time that the resource manager waits may vary and may be real-time or may be performed at intervals. If the resource manager determines that the answer is YES and the forecasted system resource utilization does exceed a quota limit of a corresponding environment, then the method proceeds to Step 206. Further, the resource manager may consider the quota limit to be exceeded if the forecasted system resource utilization reaches a percentage of (e.g., 80 percent, 90 percent, 95 percent, etc.) or threshold value in proximity to the quota limit. By considering the quota limit to be exceeded if the forecasted system resource utilization approaches the quota limit; the resource manager may provide a buffer to avoid incidentally exceeding the quota limit due to unusually high system resource utilization.

In Step 206, the resource manager determines whether a suitable environment is found to migrate one or more applications. In one or more embodiments, the resource manager identifies applications that are suitable for migrating taking into consideration the dependencies of each application and the forecasted system resource utilization of each application. Then, the resource manager searches the available environments identified in Step 200 along with the forecasted system resource utilization of the applications in each identified environment.

When considering suitable environments, the resource manager may consider multiple environments as being suitable, with different applications being migrated to different environments, as discussed below. Further, in one or more embodiments, migrating some applications may not reduce the forecasted system resource utilization to below the quota limit. In such instances, the resource manager may consider other environments to still be suitable and migrate one or more applications anyways to reduce the amount by which the quota limit is exceeded.

Further, if the resource manager finds multiple suitable environments and/or more suitable environments than are needed to reduce the forecasted system resource utilization to below the quota limit, the resource manager may analyze the suitable environments and determine which is the most suitable environment. The determination of which environment is the most suitable environment may be based on any combination of the hardware resources, networking resources (including network speed, connectivity settings, etc.), processing resources, memory or storage resources, virtualization resources located in the corresponding environment, available licenses, and/or reliability of the environment. If the resource manager finds one or more suitable environments, then the method proceeds to Step 208.

In Step 208, the resource manager migrates one or more applications to at least one of the suitable environments.

The method may end following Step 208 or return to Step 202.

Example 1

In a non-limiting example of Steps 204, 206, and 208, a first environment has a quota limit of 8 gigabytes of volatile memory and the applications on the first environment are forecasted to consume 12 gigabytes of volatile memory. As such, the forecasted system resource utilization exceeds the quota limit (Step 204). Then, the resource manager searches the identified environments that have at least some available quota of volatile memory. As an example, a second environment has 2 gigabyte of available volatile memory and a third environment has 3 gigabytes of available memory. As such, both the second and third environments are determined to be suitable environments (Step 206). Next, the resource manager analyzes the applications operating on the first environment and find a first and second applications forecasted to consume 1 gigabyte of volatile memory each and a third application forecasted to consume 2 gigabytes of volatile memory. The resource manager also determines that the third application is dependent on the first application. Then, the resource manager migrates the second application to the second environment and the first and third applications to the third environment (Step 208). In this manner, all of the applications continue to operate seamlessly and none of the quota limits are exceeded.

It should be understood that this example 1 is merely a single example and is not intended to limit the invention and is independent from any other examples discussed in this application.

End Example 1

If the resource manager determines that there is not a suitable environment and the answer to the determination in Step 206 is NO, then the method proceeds to Step 210.

In Step 210, the resource manager sends an alert to a user indicating that the forecast of system resource utilization would cause the quota limit to be exceeded. The alert sent to the user may include any information relevant to the quota limit being exceeded, including the environment forecasted to exceed the quota limit, which system resource is forecasted to be exceeded, the applications operating on the environment and how many resources each application is consuming, by how much the quota is forecasted to be exceeded, and the cost to reserve additional quota to meet the forecasted system resource utilization.

In Step 212, the resource manager reserves additional quota to extend the quota limit to meet the forecasted system resource utilization. The resource manager may automatically reserve the additional quota by determining that an auto-extend setting of quota limits is enabled. Further, the auto-extend setting may include threshold values of system resources that limits the amount of additional quota that may be automatically reserved. Further, the amount that is reserved may be the exact amount to cause the forecasted system resource utilization to not exceed the quota limits, or the amount reserved may be some additional amount in excess of the forecasted system resource utilization (e.g., a set additional amount or a percentage in excess, such as 5, 10, 15, or 20 percent). Further, all of the actions performed in Steps 206, 208, 210, and/or 212 may be considered to be a preservation mitigation action.

Further, in one or more embodiments, the resource manager does not perform Step 212 and instead sends a signal to the environment to reduce the system resource utilization. In one embodiment, the signal may cause the environment to throttle the resources available to the applications on the environment thereby limiting the performance of one or more applications on the environment. For example, if the quota limit at issue is a number of licenses for a particular application, then the signal may cause the environment to only allow the number licenses to be used and prevent any additional users from attempting to utilize one of the licenses.

The method may end following Step 212 or return to Step 202.

Example 2

In a non-limiting example of Steps 204, 206, 210, and 212, a first environment has a quota limit of 8 gigabytes of volatile memory and the applications on the first environment are forecasted to consume 12 gigabytes of volatile memory. As such, the forecasted system resource utilization exceeds the quota limit (Step 204). Then, the resource manager searches the identified environments and does not find a suitable environment, or the suitable environments do not have sufficient available quota to cause the forecasted system resource utilization to not exceed the quota limit of the first environment (Step 206). Then, the resource manager sends an alert to a user (Step 210) indicating that the forecasted system resource utilization exceeds the quota limit. Further, the alert may indicate that the forecasted system resource utilization exceeds the quota limit by 4 gigabytes of volatile memory. Next, the resource manager determines that an auto-extend setting of quota limits is enabled and that the threshold value for volatile memory is 5 gigabytes. Further, the auto-extend setting is set such that the quota limit should exceed the forecasted system resource utilization by 5 percent. Thus, the resource manager determines that an additional 4.6 gigabytes (the 4 gigabyte exceeding and 0.6 gigabytes of buffer (5 percent of 12 gigabytes)) of volatile memory should be reserved. The resource manager also determines that these 4.6 gigabytes are below the threshold value and thus automatically reserves an addition 4.6 gigabytes of volatile memory, thus extending the quota limit from 8 gigabytes of volatile memory to 12.6 gigabytes of volatile memory.

It should be understood that this example 2 is merely a single example and is not intended to limit the invention and is independent from any other examples discussed in this application.

End Example 2

Turning now to FIG. 3, FIG. 3 shows a diagram of a computing device in accordance with one or more embodiments of the invention.

In one or more embodiments of the invention, the computing device (300) may include one or more computer processors (302), non-persistent storage (304) (e.g., volatile memory, such as RAM, cache memory), persistent storage (306) (e.g., a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices (308) may be the same or different from the input device(s) (310). The input and output device(s) (308, 310) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing resource utilization, the method comprising:

identifying a first quota limit of a first environment and a second quota limit of a second environment;

performing a forecast of system resource utilization for an application running on the first environment;

making a first determination that the forecast of system resource utilization exceeds the first quota limit;

making a second determination that the forecast of system resource utilization would not cause the second quota limit to be exceeded by:

making a second forecast of environment resource utilization of a second application running on the second environment, and wherein the second determination also comprises determining that the second forecast and the forecast would not cause the second quota limit to be exceeded; and migrating the application from the first environment to the second environment based on the first and second determinations.

2. The method of claim 1, further comprising:

making a third determination that the second environment is a suitable environment for the application, and wherein migrating the application is also based on the third determination.

3. The method of claim 2, wherein the third determination is based on at least one of the following factors: reliability of the second environment, network speed of the second environment, and connectivity settings of the second environment.

4. The method of claim 1, further comprising:

sending an alert to a user indicating that the forecast of system resource utilization would cause the first quota limit to be exceeded.

5. The method of claim 1, wherein the forecast is based on historical system resource utilization for the application.

6. The method of claim 1, wherein the first quota limit is based on any combination of hardware resources, networking resources, processing resources, memory or storage resources, virtualization resources located in the corresponding environment, available licenses, and reliability of the first environment.

7. A method for managing resource utilization, the method comprising:

identifying a current resource allocation limit of a first environment;

forecasting a future resource allocation limit of the first environment based on historical resource allocation limits;

making a determination that the future resource allocation limit is greater than the current resource limit;

making a second determination that an auto-extend setting of resource allocation limits is enabled; and performing a resource mitigation action based on the determination by increasing the current resource allocation limit and is based on the second determination.

8. The method of claim 7, further comprising:

sending an alert to a user indicating that the future resource allocation limit is greater than the current resource allocation limit.

9. The method of claim 7, wherein the current resource allocation limit is based on any combination of hardware resources, networking resources, processing resources, memory or storage resources, virtualization resources located in the first environment, available licenses, and/ reliability of the first environment.

10. The method of claim 7, wherein the auto-extend setting comprises a threshold value of system resource utilization and the method further comprises:

making a third determination, in response to the second determination, that the future resource allocation limit does not exceed the threshold value, and wherein increasing the current resource allocation limit is also based on the third determination.

* * * * *